F. H. HOWARD.
PLASTIC BLOCK AND EARTHENWARE APPARATUS.
APPLICATION FILED SEPT. 23, 1909.
981,267.
Patented Jan. 10, 1911.
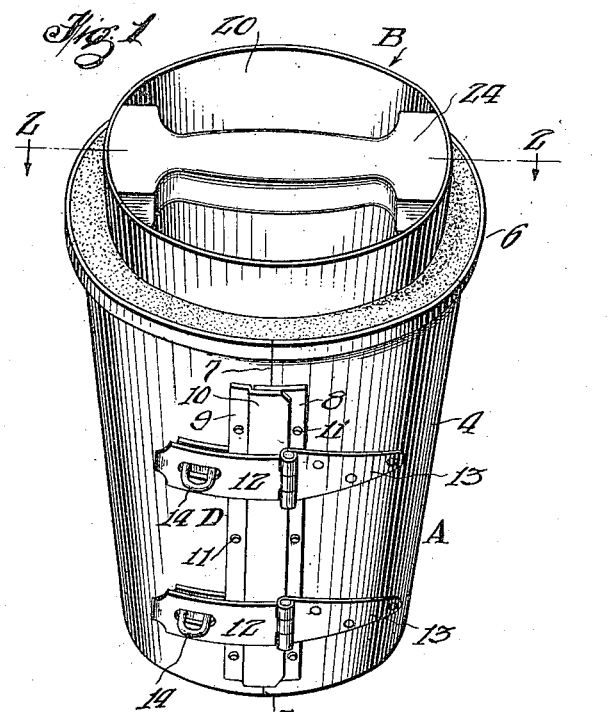
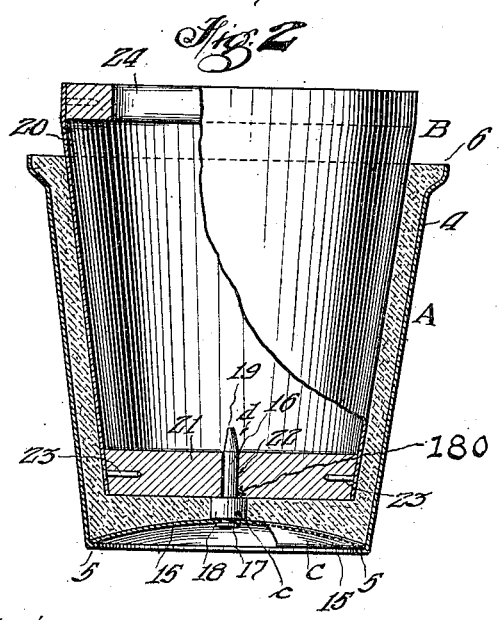

UNITED STATES PATENT OFFICE.

FREDERICK H. HOWARD, OF MONTEBELLO, CALIFORNIA.

PLASTIC BLOCK AND EARTHENWARE APPARATUS.

981,267.

Specification of Letters Patent. Patented Jan. 10, 1911.

Application filed September 23, 1909. Serial No. 519,261.

*To all whom it may concern:*

Be it known that I, FREDERICK H. HOWARD, a citizen of the United States, residing at Montebello, in the county of Los Angeles and State of California, have invented new and useful Improvements in Plastic Block and Earthenware Apparatus, of which the following is a specification.

This invention relates to molds, and more particularly to molds for producing flower pots, and similar and analogous objects and utensils, the invention coming within the broad classification of plastic block and earthenware apparatus, which includes expanding and separable pipe and other molds; and the invention has for its object to provide improved apparatus of the general character stated, which will be superior in point of relative simplicity and inexpensiveness of construction or formation and organization, and convenience and efficiency in service, and which will be generally superior in point of serviceability and in the character and quality of the product resultant upon its employment.

A particular object of the invention consists in the provision of an improved mold or molding apparatus, especially adapted for the production of molded cement or concrete flower pots.

With the above and other objects in view, the invention consists in the novel provision, combination, association and construction of parts, members and features, all as hereinafter described, shown in the drawing, and finally pointed out in claim.

In the drawing:—Figure 1 is an isometric view of an improved mold embodying the invention, the same being shown in employment in the production of molded flower pots; Fig. 2 is a vertical, transverse, sectional view, taken upon the line 2—2, Fig. 1, and looking in the general direction of the appended arrows, part being shown broken away and part in full lines for clearness of illustration; and, Fig. 3 is an isometric view, upon a diminished scale, of a flower pot constituting a product of the mold shown in the other figures.

Corresponding parts and features in all the figures are denoted by the same reference characters.

Referring with particularity to the drawing, the improved mold shown therein as embodied in a preferred form of construction and combination of parts and features, comprises two members, an outer member A, and an inner member B, respectively, with which is associated in service a bottom member C; the flower pot or other product of the molding operation, such as that shown in Fig. 3, being formed between the members A and B, and between the member B and the member C. The inner member B constitutes the core of the mold, and the outer member A constitutes the shell of the mold; and the bottom member C is provided with a core member *c*, and with centering means *d*, serving to properly locate and maintain in proper position the core B. The core member *c* serves to form the central bottom opening in the molded flower pot.

The mold member A, or shell, comprises a hollow, preferably metallic body 4, which is substantially of inverted, truncated, conical formation, and open at both top and bottom, being provided at its bottom portion with an inwardly directed annular flange 5. The top portion of the body 4 is formed into an outwardly flaring flange 6 at its mouth, conforming to the shape and proportion of the mouth of the flower pot molded therein. The hollow body 4, preferably of sheet metal, is divided vertically at one side, as at 7; and holding means D are applied to the opposite edge portions so produced. In order to bring said edge portions into proper fit and registration, to one of the same is applied a vertical strip or sheet 8, preferably metallic, and conforming to the curvature of the body 4; the strip 8 being substantially the full height of and overlapping the vertical division 7, as clearly shown in Fig. 1 so as to close it reliably. A little back of the edge portion so overlapped is applied a similar sheet or strip 9, which is offset and provided with a broad, angularly directed lip 10, overlapping the strip 8, and adapted to engage the same in close facial contact so as to reinforce it. The strips 8 and 9 may be secured to the body 4 by bolts, rivets, or other securing device 11, properly formed and countersunk to prevent encroachment of the same upon the space within the body 4. The holding means further comprise hinged latches 12, each having one leaf connected, as at 13, with the body 4, at one side of the vertical division 7 thereof, and each having its other leaf slotted to receive a looped keeper 14, secured to the body 4 at the other side of the vertical division 7. When the latches are engaged with the keepers they overlie the strips so that the lip 10 of the strip 9 is held over and in engagement with the strip 8, and the strip 8 is held in position to overlap and thoroughly close the vertical division 7, maintaining the edge portions of the body 4 in perfect alinement and maintaining the proper contour of the inner walls of the body 4. If desired, supplemental locking devices, such as wedges or pins, may be passed through the keepers 14, exteriorly of the latches 12, to hold the latter firmly in operative positions.

The mold member C comprises a concavo-convex or upwardly arching plate 15, having a periphery conforming to the inner diameter of the body 4 at the lower portion thereof; said plate 15 being adapted to rest at its periphery upon the flange 5. The core member c and centering means d are preferably integral in construction, and comprise a pin 16, the lower end of which passes through a central opening in the plate 15, being headed beneath the same, as at 17. Directly over the plate 15, the pin 16 is provided with an enlargement 18, shown as circular to form a hole in the base of the flower pot and the upper end of the enlargement presents a shoulder 180 upon which the bottom plate 21 rests; and the pin is reduced and extended above the enlargement to a pre-determined length, terminating in a tapering upper end portion 19.

The inner mold member B comprises a hollow body 20, preferably of sheet metal, and of inverted, truncated, conical formation, the lower portion of the same being closed by a head or plate 21, secured therein by pins, nails, or other holding devices 23. The bottom plate 21 is provided with a central transverse opening 22, which fits the transverse dimensions of the reduced end of the body of the pin 16, which last passes through and entirely fills said opening when the member B is in operative position within the member A. With the members in the relative positions last stated, the bottom plate 21 rests directly upon the shoulder 180 at the upper end of the enlargement 18; and said enlargement and the pin 16 maintain the member B firmly in operative position, the entirety being supported upon the arched bottom plate 15, which in turn rests upon the flange 5 at the bottom of the member A. The conformation of the bottom plate 5, arched or otherwise, determines the superficial form and the thickness of the bottom of the flower pot or other product. A grip or handle member 24 spans the hollow body 20 of the inner member B at the top of the same, rendering convenient the handling and manipulation of the inner member or core B.

The operation, method of use and advantages of the molding apparatus constituting the invention will be readily understood from the foregoing description, taken in connection with the accompanying drawings and the following statement:

The members A and B are relatively proportioned so as to provide the required space between the same, as shown in Fig. 2, when assembled for the molding operation; and the bottom member C is proportioned and formed as required to provide a space between the same and the bottom plate 21 of the member B, which will resultantly produce the required bottom formation of the flower pot or other product; it being understood that the side walls of the pot or other product are formed between the side walls of the member B and the member A. The enlargement 18 of the pin 16, constituting the core member c, is properly proportioned to produce the desired opening in the bottom of the pot. With the bottom member C resting at its edge portion on the flange 5 at the lower portion of the member A, and the pin 16 of the centering means d projecting upwardly therefrom above the enlargement 18, constituting the core member c, the mold member or core B is passed into the interior of the member A through the upper orifice of the latter, and the bottom part 21 is brought to bear upon the enlargement 18, with the body of the pin 16 projecting upwardly through the opening 22 and properly centering the member B within the member A. Prior to assembling the members A, B and C, and after placing the member C in position at the bottom of the member A, the plastic material of which the pot or other object is to be formed is massed into the member A and upon the plate 15 of the member C until the upper surface of the plastic material extends flush with the upper surface of the core member c. The member B is then passed into the member A, and centered by the centering means d, as described, the bottom part 21 resting upon the upper surface of the enlargement 18 and upon the upper surface of the plastic mass, which rests upon the plate 15 of the member C. A further quantity of the plastic material is now massed into the space between the side walls of the members A and B, and during the first stages of this step suitable wedges may be inserted between the members A and B, at spaced points, if desired, to supplement the centering action of the centering means d. As the plastic mass ascends to the flange 6 at the mouth of the body 4 of the member A, the wedges between the bodies A and B are removed, and the plastic mass is finished off smooth and flush with the upper face of the flange 6. The walls of the body 20 of the member B preferably rise slightly above the plane of the flange 6, as shown, so that the top formation of the pot or other article may be accurately produced. After the green plastic mixture has been compressed firmly in the spaces between the members A, B and C, and has begun to set in the proper formation, the core or member B is withdrawn from the molded article by the handle member 24, the product of the apparatus being permitted to remain within the member A and upon the member C until fully set and hardened, when the holding means D, which have been in operative position during the molding operation, are manipulated to permit the edge portion at the side of the vertical division 7 of the body 4 to be relatively spaced, freeing the molded product from the inner walls of the member A, and permitting the member C to drop out through the open bottom of the member A. The molded product is then set aside for final drying or hardening; or if sufficiently matured, is ready for service. The member B may be employed successively in connection with the remaining members and features of other molding apparatus, as it is only required in service in the massing of the plastic material within the mold and to assure the initiation of the setting of the molded mass.

The combination of features and parts comprising the bottom plate or member 15, the centering means $d$ and the core member $c$, the latter two parts constituting the pin 16 of the particular formation shown and described, taken together with the bottom portion of the member B and the opening therein, constitutes a provision and association of features of simple organization and directed at effective operation and service for the purposes concerned.

I do not desire to be understood as limiting myself to the specific provision, formation, combination and association of parts, members and features shown and described as embodying the invention; but reserve the right to vary the same, in adapting the improvements to various conditions of use, without departing from the spirit of the invention or the terms of the following claim.

Having thus described my invention, I claim and desire to secure by Letters Patent:—

A mold for flower pots and the like having a hole in their bottom, comprising an inner member having an axial opening in its bottom; an outer member concentric with and inwardly spaced from said inner member, an inwardly projecting flange around its lower edge; and a bottom member comprising an arched plate whose edges rest on said flange and whose top defines the exterior contour of the bottom of the article being produced, and a pin fast through the center of said plate, its smaller upper end entering the hole in said inner member to center the latter, and its body below said end provided with an enlargement defining the hole in the article being produced and extending from said plate to the bottom of the inner member and forming a shoulder to support the latter.

In testimony whereof, I have signed my name to this specification in the presence of two subscribing witnesses.

FREDERICK H. HOWARD.

Witnesses:
FRED A. MANSFIELD,
HOWARD CREIGHTON.